US008589339B2

(12) United States Patent
Nakamura

(10) Patent No.: US 8,589,339 B2
(45) Date of Patent: Nov. 19, 2013

(54) DATA COLLECTION DEVICE, PROGRAM, AND DATA COLLECTION METHOD

(75) Inventor: Mitsuhiro Nakamura, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 746 days.

(21) Appl. No.: 11/162,685

(22) Filed: Sep. 19, 2005

(65) Prior Publication Data

US 2006/0259522 A1   Nov. 16, 2006

(30) Foreign Application Priority Data

May 16, 2005   (JP) ................................ 2005-142570

(51) Int. Cl.
*G06F 17/30* (2006.01)
(52) U.S. Cl.
USPC ........................................................ 707/609
(58) Field of Classification Search
USPC ........................................................ 707/609
See application file for complete search history.

(56) References Cited

U.S. PATENT DOCUMENTS

| | | | |
|---|---|---|---|
| 6,792,280 B1 | 9/2004 | Hori et al. | |
| 2002/0138296 A1* | 9/2002 | Holmes, Jr. | 705/1 |
| 2003/0154403 A1* | 8/2003 | Keinsley et al. | 713/201 |
| 2004/0081300 A1* | 4/2004 | Takae et al. | 379/114.01 |
| 2004/0267743 A1* | 12/2004 | Dasari et al. | 707/6 |
| 2005/0027504 A1* | 2/2005 | Watanabe | 703/22 |
| 2005/0027540 A1* | 2/2005 | Yamada et al. | 704/275 |
| 2005/0049934 A1 | 3/2005 | Nakayama et al. | |
| 2005/0243365 A1* | 11/2005 | Noda | 358/1.15 |

FOREIGN PATENT DOCUMENTS

| | | |
|---|---|---|
| JP | 7-325513 | 12/1995 |
| JP | 11-355346 | 12/1999 |
| JP | 2000-259520 | 9/2000 |
| JP | 2001-092910 | 4/2001 |
| JP | 2004-265335 | 9/2004 |
| WO | WO 01/03410 | 1/2001 |

OTHER PUBLICATIONS

Notification of Reasons for Rejection, mailed Sep. 25, 2007, issued in corresponding Japanese Patent Application No. 2005-142570, and translation thereof.
Final Rejection in corresponding Japanese Patent Application No. 2005-142570, issued by the JPO, dated Jun. 17, 2008, with the English translation.

* cited by examiner

*Primary Examiner* — Hosain Alam
*Assistant Examiner* — Johnese Johnson
(74) *Attorney, Agent, or Firm* — Buchanan Ingersoll & Rooney PC

(57) ABSTRACT

The present invention provides a data collection device that lightens a registering workload for an administrator and prevents that a set of procedures for a data collection is started later than a registered start time. A data collection device 101 comprises: a database 105 in which start times of the sets of the procedures have been previously registered; and a registration control unit operable, if a received specified time is the same as any of the previously registered start times, to search and retrieve a time that is different from any of the previously registered start times in association with a new set of the procedures, instead of registering the specified time.

26 Claims, 10 Drawing Sheets

FIG.4

| ENTRY NO. | START TIME | COMMUNICATION METHOD | ADDRESS | DATA TYPE | MODEL | DIVISIONAL MANAGEMENT FUNCTION |
|---|---|---|---|---|---|---|
| 1 | 9:45 | TELEPHONE COMMUNICATION | 0123-4567 | COUNTER INFORMATION | MODEL A | NOT AVAILABLE |
| 2 | 9:49 | TELEPHONE COMMUNICATION | 1234-5678 | COUNTER INFORMATION | MODEL B | NOT AVAILABLE |
| 3 | 9:56 | TELEPHONE COMMUNICATION | 0123-7654 | PERIODIC MONITORING | MODEL C | - |
| 4 | 10:00 | TELEPHONE COMMUNICATION | 9876-5432 | COUNTER INFORMATION | MODEL D | NOT AVAILABLE |
| 5 | 10:10 | TELEPHONE COMMUNICATION | 2345-1234 | COUNTER INFORMATION | MODEL A | AVAILABLE |

FIG.5

| MODEL | DATA TYPE | DIVISIONAL MANAGEMENT FUNCTION | AVERAGE REQUIRED TIME |
|---|---|---|---|
| MODEL A | COUNTER INFORMATION | NOT AVAILABLE | 2 MINUTES |
| | | AVAILABLE | 4 MINUTES |
| | PERIODIC MONITORING | — | 5 MINUTES |
| MODEL B | COUNTER INFORMATION | NOT AVAILABLE | 1 MINUTE |
| | | AVAILABLE | 2 MINUTES |
| | PERIODIC MONITORING | — | 3 MINUTES |
| MODEL C | COUNTER INFORMATION | NOT AVAILABLE | 3 MINUTES |
| | | AVAILABLE | 6 MINUTES |
| | PERIODIC MONITORING | — | 7 MINUTES |
| MODEL D | COUNTER INFORMATION | NOT AVAILABLE | 2 MINUTES |
| | | AVAILABLE | 4 MINUTES |
| | PERIODIC MONITORING | — | 5 MINUTES |

FIG.6

| ENTRY NO. | START TIME | COMMUNICATION METHOD | ADDRESS | DATA TYPE | MODEL | DIVISIONAL MANAGEMENT FUNCTION |
|---|---|---|---|---|---|---|
| 6 | 10:00 | TELEPHONE COMMUNICATION | 6789-0123 | COUNTER INFORMATION | MODEL A | NOT AVAILABLE |
| 7 | 10:00 | TELEPHONE COMMUNICATION | 3456-7890 | PERIODIC MONITORING | MODEL B | 1 |
| 8 | 10:00 | TELEPHONE COMMUNICATION | 1234-2345 | COUNTER INFORMATION | MODEL A | NOT AVAILABLE |
| 9 | 10:00 | TELEPHONE COMMUNICATION | 2222-1111 | COUNTER INFORMATION | MODEL C | NOT AVAILABLE |
| 10 | 10:00 | TELEPHONE COMMUNICATION | 3333-4444 | COUNTER INFORMATION | MODEL D | 1 |

FIG.7

| ENTRY NO. | START TIME | COMMUNICATION METHOD | ADDRESS | DATA TYPE | MODEL | DIVISIONAL MANAGEMENT FUNCTION |
|---|---|---|---|---|---|---|
| 1 | 9:45 | TELEPHONE COMMUNICATION | 0123-4567 | COUNTER INFORMATION | MODEL A | NOT AVAILABLE |
| 2 | 9:49 | TELEPHONE COMMUNICATION | 1234-5678 | COUNTER INFORMATION | MODEL B | NOT AVAILABLE |
| 3 | 9:56 | TELEPHONE COMMUNICATION | 0123-7654 | PERIODIC MONITORING | MODEL C | — |
| 4 | 10:00 | TELEPHONE COMMUNICATION | 9876-5432 | COUNTER INFORMATION | MODEL D | NOT AVAILABLE |
| 5 | 10:10 | TELEPHONE COMMUNICATION | 2345-1234 | COUNTER INFORMATION | MODEL A | AVAILABLE |
| 6 | 10:03 | TELEPHONE COMMUNICATION | 6789-0123 | COUNTER INFORMATION | MODEL A | NOT AVAILABLE |
| 7 | 10:06 | TELEPHONE COMMUNICATION | 3456-7890 | PERIODIC MONITORING | MODEL B | — |
| 8 | 10:15 | TELEPHONE COMMUNICATION | 1234-2345 | COUNTER INFORMATION | MODEL A | NOT AVAILABLE |
| 9 | 10:18 | TELEPHONE COMMUNICATION | 2222-1111 | COUNTER INFORMATION | MODEL C | NOT AVAILABLE |
| 10 | 10:22 | TELEPHONE COMMUNICATION | 3333-4444 | PERIODIC MONITORING | MODEL D | — |

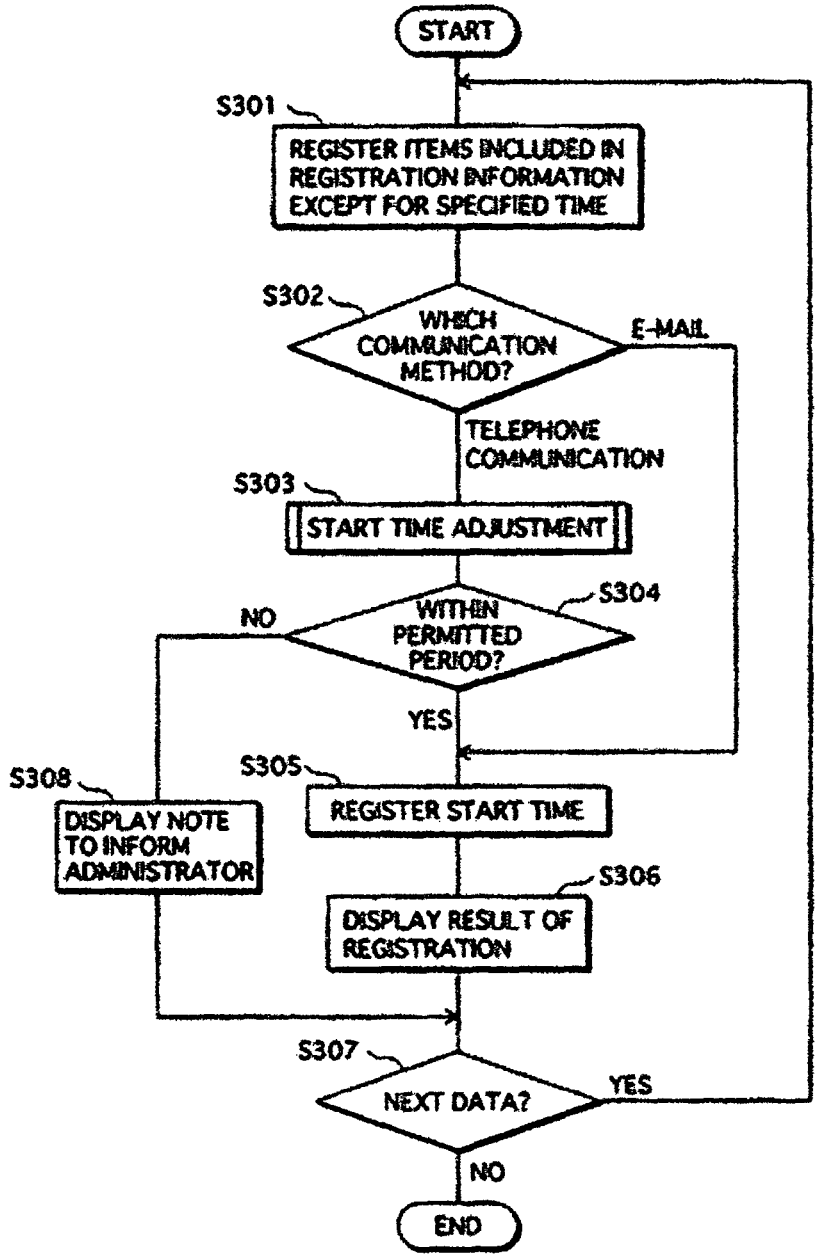

DATA COLLECTION DEVICE, PROGRAM, AND DATA COLLECTION METHOD

CROSS-REFERENCE TO RELATED APPLICATION

This application is based on application NO. 2005-142570 filed in Japan, the contents of which are hereby incorporated by reference.

BACKGROUND OF THE INVENTION (1) Field of the Invention

The present invention relates to a data collection device that collects data from a terminal device, a program for the data collection, and a data collection method. The present invention particularly relates to a function of registering a start times of sets of procedures performed for the data collection.

(2) Description of the Related Art

Conventionally, data collection devices have been used for periodically collecting several types of data from terminal devices, such as an MFP (Multi Functional Peripheral) set up in a customer's office. For instance, Japanese laid-open patent publication application No. H07-325513 discloses a technique to collect operational data of a copy machine by connecting a data collection device to the copy machine through telephone lines. The data collection device realizes accounting based on usage by collecting the operational data. Further, the data collection device can realize not only the accounting but also malfunction detection, depending on the type of data to be collected. Additionally, in recent years, data collection systems using not only telephone lines but E-mails to collect data have brought into operation.

Generally, the data collection device registers start times of sets of procedures performed for the data collection. (Each set of the procedures for the data collection includes a series of procedures that starts with a request for the data and ends with an obtainment of the data). Usually, the start time is manually registered one by one by the administrator of the data collection device.

In recent years, the data collection devices have had many occasions to be merged and abolished, as companies or departments in a company have been merged and abolished. On such occasions, the administrator is required to transfer the registration information, such as the start times, from a data collection device that should be withdrawn from service, to a data collection device that should remain in service.

However, the number of entries included in the registration information is very large, and the burden on the administrator is great if the administrator has to manually transfer the data one by one. To solve this problem, a method for copying all the registration information at the same time has been worked out.

Nevertheless, if the data collection device simply copies the registration information, the number of the duplicative sets of the procedures might exceed the maximum number that the data collection device can manage at the same time. If this is the case, the data collection device can not start some procedures until other proceeding procedures have been finished. Therefore, some procedures will be started later than the actual registered times.

The data collection device is used for a system that charges the customers according to the usage of the terminal devices. Generally, the date and time for collecting the data is specified by each customer. If the data collection is started later than the specified time, the accounting operation often becomes unsmooth. Therefore, it is a problem if the start of the data collection is delayed.

SUMMARY OF THE INVENTION

The object of the present invention is therefore to provide a data collection device, a program for the data collection, and a data collection method that can lighten the registering workload for the administrator and prevent that the set of procedures for the data collection is started later than the registered start time.

The above object is fulfilled by a data collection device that performs sets of procedures for collecting data from terminal devices, the data collection device comprising: a database in which start times of the sets of the procedures have been previously registered; a receiving unit operable to receive a specified time that is to be newly registered in the database as a start time of a new set of the procedures; and a registration control unit operable, if the received specified time is the same as any of the previously registered start times, to search and retrieve a time that is different from any of the previously registered start times in association with the new set of the procedures, instead of registering the specified time.

The above object is fulfilled by a program that causes a computer for collecting data from terminal devices to perform: a receiving step of receiving a specified time that is to be newly registered in a database as a start time of a new set of the procedures; and a registration control step of searching and retrieving, if the received specified time is the same as any of previously registered start times in the database, a time that is different from any of the previously registered start times in association with the new set of the procedures, instead of registering the specified time.

The above object is fulfilled by a data collection method for performing sets of procedures for collecting data from terminal devices, the data collection method comprising: a receiving step of receiving a specified time that is to be newly registered in a database as a start time of a new set of the procedures; and a registration control step of searching and retrieving, if the received specified time is the same as any of previously registered start times in the database, a time that is different from any of the previously registered start times in association with the new set of the procedures, instead of registering the specified time.

With the stated structures, the start time of the new set of the procedures can not be the same as any of the previously registered start times. Therefore, the data collection device can prevent that the set of procedures for the data collection is started later than the registered start time. Also, with the stated structures, if the received specified time is the same as any of the previously registered start times, an alternative time can be automatically searched for. This lightens the workload of the administrator, because it becomes unnecessary for the administrator to searching for the alternative time by himself.

The data collection device may further comprise: a storing unit operable to store a required time for completing each set of the procedures, wherein the registration control unit may search and retrieve, if a first time period overlaps any of second time periods, a time at a beginning of a third time period, instead of registering the specified time, even if the received specified time is different from any of the previously registered start times, the first time period being a period of the required time from the specified time, each second time period being a period of the required time from each previously registered start time, and the third time period not overlapping any of the second time periods.

With the stated structure, the data collection device can more effectively prevent the above-described problem of the duplication by considering not only the times but also the time periods.

The registration control unit may further register the retrieved time in the database in association with the new set of the procedures.

With the stated structure, the alternative time can be automatically registered. This further lightens the workload of the administrator.

If the first time period is different from any of the second time periods, the registration control unit may further register the specified time in the database in association with the new set of the procedures.

With the stated structure, the all the procedures to be registered can be automatically registered. This further lightens the workload of the administrator.

The registration control unit may include: a judging subunit operable to judge whether the first time period overlaps any of the second time periods; and a registering subunit operable, if the judging subunit judges in the negative, to register a time at a beginning of the first time period in association with the new set of the procedures, and operable, if the judging subunit judges in the affirmative, to replace the first time period with a time period that is shifted a predetermined time from the second time period.

With the stated structure, adjustment of the specified time is repeatedly performed until the judging subunit judges in the negative. If the predetermined time is short, the data collection device can register a time that is as nearest to the specified time even if the received specified time is not suitable for being registered without change.

The registration control unit may include: a presenting subunit operable, if the first time period overlaps any of the second time periods, to present a list of one or more time periods each of which does not overlap any of the second time periods; and a registering subunit operable to register a time at a beginning of a time period that is selected from the list by a user in association with the new set of the procedures. With the stated structure, a time that is not expected by the administrator can not be registered.

The data collection device may further comprise: a storing unit operable to store a permitted period within which the start time of the new set of the procedures is permitted to be registered, wherein the registration control unit may register the time at the beginning of the third time period only if the third time period is within the permitted period.

With the stated structure, the time at the beginning of the time period within the permitted period is to be registered. Accordingly, a time that is not expected by the administrator can not be registered if the administrator has set the permitted period previously.

The required time may be a time that was required to complete the same procedures as each set of the procedures in the past, and may have been previously stored in the storing unit in association with a model of a terminal device relating to each set of the procedures. The receiving unit may further receive a model of a terminal device relating to the new set of the procedures. The registration control unit may use the required time that corresponds to the received model.

With the stated structure, a history of required times, which is classified based on the model of the terminal device, is used for determining the required time. Accordingly, the required time can be estimated appropriately even in the case where the data of the same type has different amount depending on the model of the terminal device, and in the case where the response time is different depending on the model of the terminal device.

The data may represent usage of each terminal device per user. The required time may be a time that was required to complete each set of the procedures in the past, and may have been previously stored in the storing unit in association with a combination of a model of a terminal device relating to each set of the procedures and a number of users of the terminal device. The receiving unit may further receive a model of a terminal device relating to the new set of the procedures and a number of users of the terminal device. The registration control unit may use the required time that corresponds to the received combination of the model of the terminal device relating to the new set of the procedures and the number of the users of the terminal device.

With the stated structure, the history of the required times, which is classified based on a combination of the model of the terminal device and the number of users, is used for determining the required time. Accordingly, the required time can be estimated appropriately even in the case where the data amount is different depending on the number of the users. Here, the "users" includes users in each division in terms of a so-called "divisional management function", which is described later.

The sets of the procedures may be performed using a communication method having a limit to a maximum number of duplicative registrations in the database, and the registration control unit may register, if a number of registrations in the database is less than the maximum number, the specified time in the database in association with the new set of the procedures, even if the specified time is the same as any of the previously registered start times.

With the stated structure, the number of the duplicative registrations does not become more than the limit. Accordingly, the data collection device can prevent the delay of the start time of the set of procedures for the data collection.

The receiving unit may further receive a communication method that is used for collecting the data from the terminal devices, and the registration control unit may register, if the communication method received by the receiving unit is a predetermined communication method, the specified time received by the receiving unit without change in association with the new set of the procedures.

With the stated structure, the data collection device unconditionally registers the specified time if the communication method used for the data collection is the predetermined communication method. Accordingly, unnecessary adjustment of the specified time can be omitted, and the time required for the registrations can be reduced.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows an example of registration information already registered in a database 105;

FIG. 5 shows an example of a history of required times, which is stored in a history storing unit 103;

FIG. 6 shows an example of registration information as to new entries received by a data collection unit 101;

FIG. 7 shows a registration result showing new entries 6 to 10 registered in a database 105;

FIG. 10 is a flowchart showing operations to register a new entry performed by a data collection device 301 according to the third embodiment.

DESCRIPTION OF THE PREFERRED EMBODIMENTS

The following describes the preferred embodiments of the present invention with reference to drawings.

The First Embodiment

<Structure>

Figure 1:
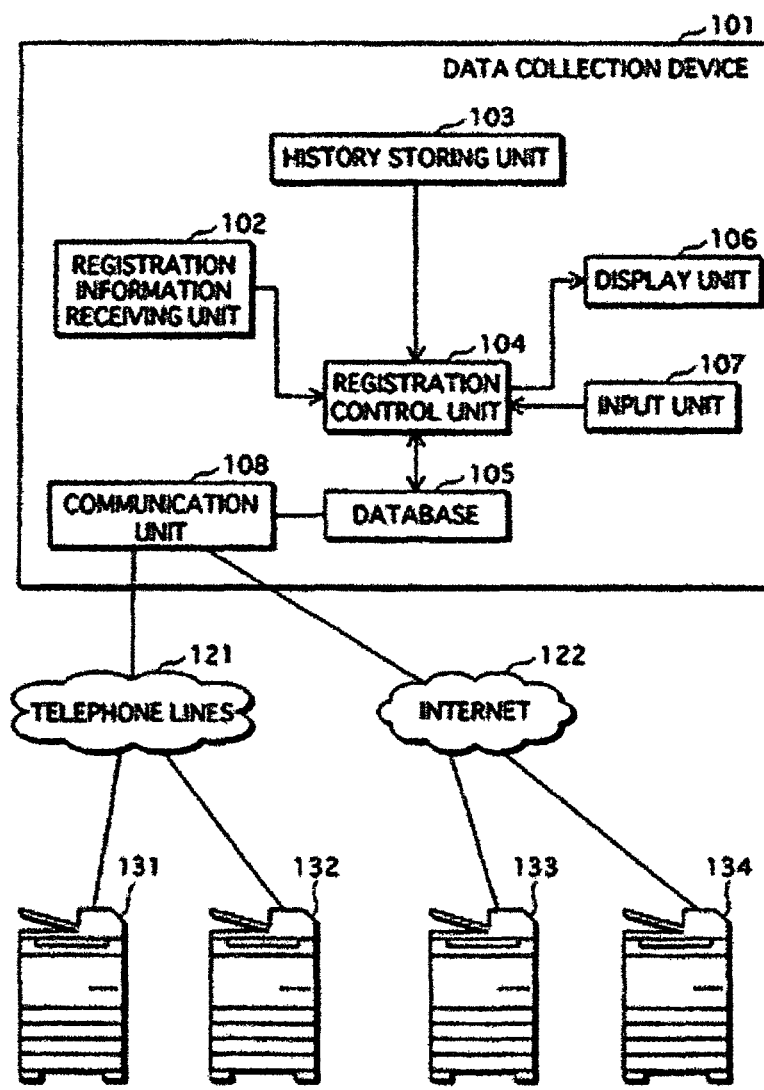
FIG. 1 is a functional block diagram showing a structure of a data collection device according to the first embodiment.

FIG. 1 is a functional block diagram showing the structure of a data collection device according to the first embodiment.

A data collection device 101 includes a registration information receiving unit 102, a history storing unit 103, a registration control unit 104, a database 105, a display unit 106, an input unit 107, and a communication unit 108.

The data collection device 101 supports two types of communication methods. One is a telephone communication method, by which the data collection device 101 communicates with a MFP 131 and a MFP 132 via telephone lines 121, and the other is an E-mail method, by which the data collection device 101 sends and receives E-mails to/from an MFP 133 and an MFP 134 via the Internet 122.

Although illustrated as a functional block in FIG. 1, the data collection device 101 actually is a computer system that includes a microprocessor, a ROM, a RAM, a hard disk unit, a display unit, a keyboard, a mouse, and so on. The RAM or the hard disk unit stores therein a computer program. The function of each functional block is realized by the microprocessor operating in accordance with the computer program.

The database 105 stores, for each set of procedures for the data collection (each set is hereinafter called an "entry"), items of data, namely (a) the start time of the data collection, (b) the communication method used for the data collection, (c) the address of the MFP at the destination, (d) the type of the data to be collected, (e) the model of the MFP at the destination, and (f) availability of a divisional management function of the MFP at the destination.

Here, the "divisional management function" is a function for managing the collected data in a particular way, by which pieces of the data collected from several divisions in a company are separately managed for each division.

The communication unit 108 performs the data collection by the telephone communication method or the E-mail method at the start time registered in the database 105. The data to be collected by the data collection includes counter information and periodic monitoring information. The counter information indicates the number of prints that the MFP has been printed out. The periodic monitoring information is information as to the operational status of the MFP, which is regularly monitored.

The registration information receiving unit 102 receives registration information as an entry of the data collection, which is to be registered (Such an entry is hereinafter called a "new entry"). The registration information includes items of data, namely (a) a specified time of the data collection, which is specified by the administrator as a desired start time, (b) the communication method used for the data collection, (c) the address of the MFP at the destination, (d) the type of the data to be collected, (e) the model of the MFP at the destination, and (f) availability of the divisional management function of the MFP at the destination.

The history storing unit 103 stores therein a history of required times, which were a list of times required for processing entries in the past, in association with the model of the MFP and the availability of the divisional management function of the MFP.

The registration control unit 104 registers the received registration information in the database 105 in accordance with the operations described later.

The display unit 106 displays the result of the registration on an external monitor. The input unit 107 receives instructions from the administrator of the data collection device 101.

<Operations>

Figure 2:
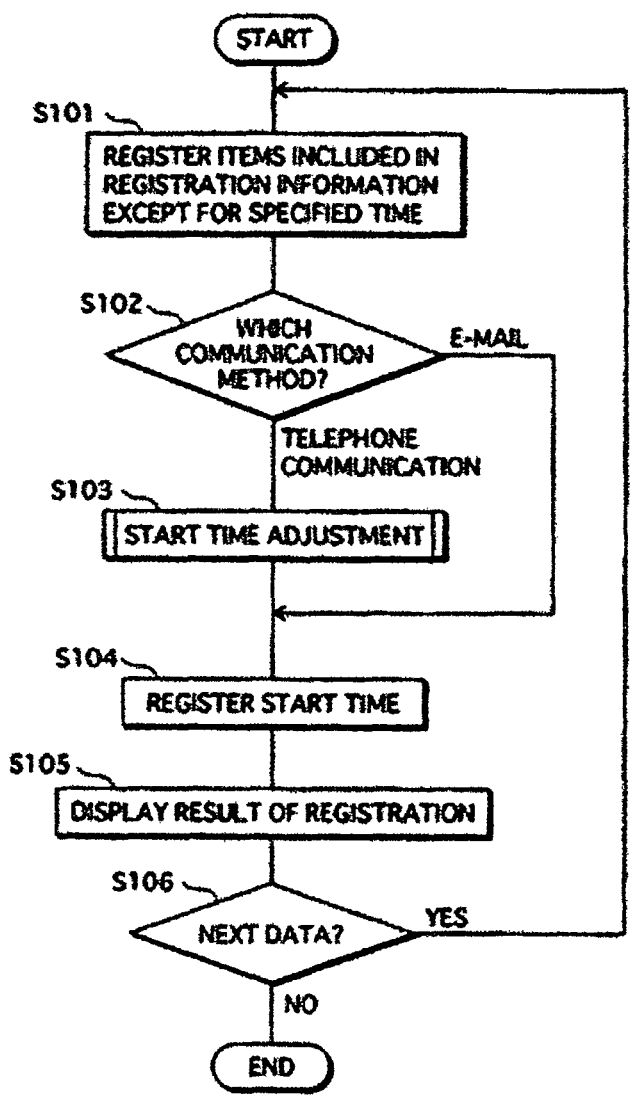
FIG. 2 is a flowchart showing operations to register a new entry performed by a data collection device according to the first embodiment.

FIG. 2 is a flowchart showing the operations performed by the data collection device 101 to register a new entry.

Firstly, the data collection device 101 registers the items of data included in the received registration information except for the specified time (step S101).

Next, the data collection device 101 extracts the communication method used for the data collection. If the communication method is the telephone communication method, the specified time is to be adjusted through a start time adjustment (step S103), and a time that is obtained as the result of the adjustment is to be registered as the start time (step S104). If the communication method is the E-mail method, the specified time is to be registered as the start time without change (step S104). Then, the data collection device 101 displays the result of the registration (step S105).

The data collection device 101 repeats the above-described operations until all the new entries are registered (step S106).

Figure 3:
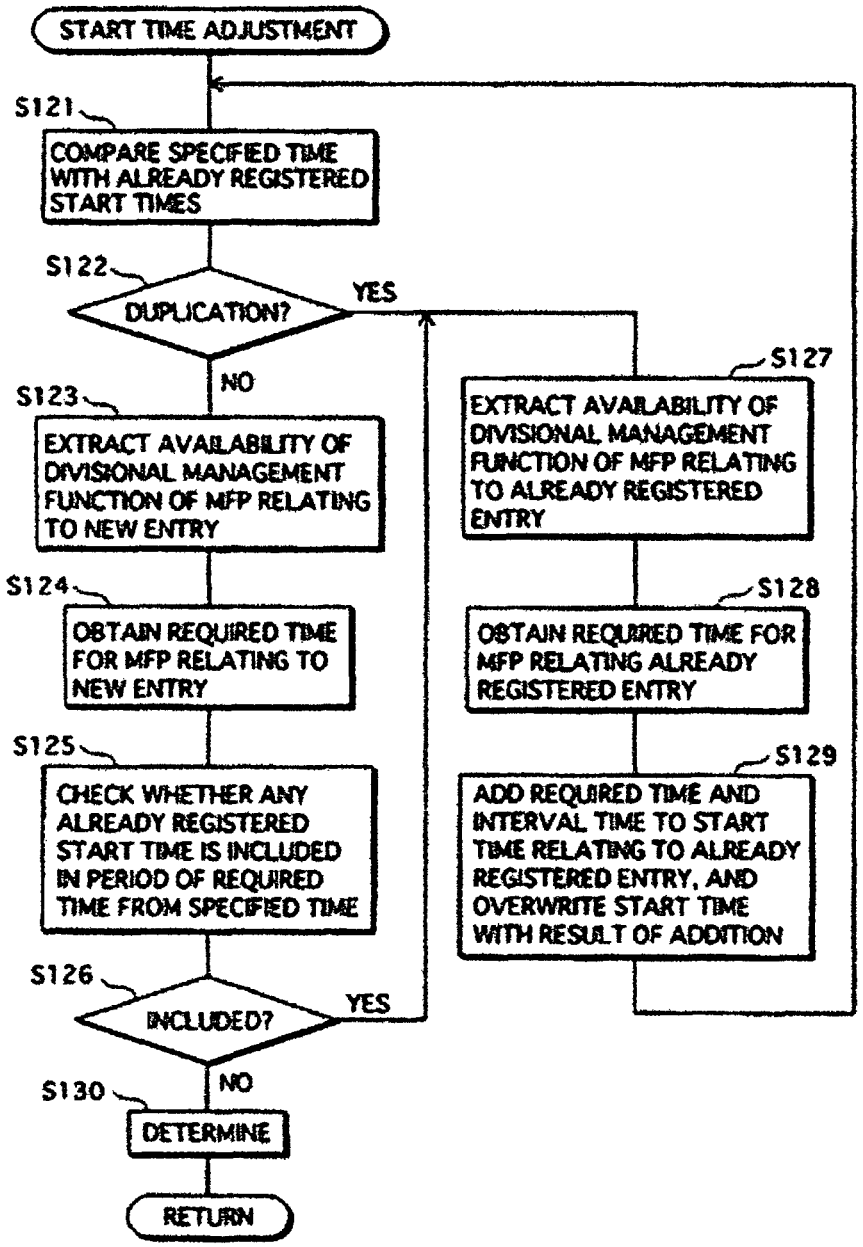
FIG. 3 shows details of start time adjustment according to the first embodiment.

FIG. 3 shows the details of the start time adjustment according to the first embodiment.

The data collection device 101 compares the received specified time with the already registered start times (step S121). In this specification, the "data collection" means a series of procedures that starts with a request for the data and ends with an obtainment of the data. Accordingly, the "data collection" in the case of the telephone communication method means a series of procedures that starts with connection to the telephone line and a request for the data addressed to the MFP, and ends with a reception of the data transmitted from the MFP according to the request and disconnection of the line. Meanwhile, the "data collection" in the case of the E-mail method means a series of procedures that starts with transmission of an E-mail in conformity with SMTP (Simple Mail Transfer Protocol), and ends with reception of data transmitted from the MFP in conformity with POP3 (Post Office Protocol 3).

If the received specified time is not the same as any of the already registered start times (step S122: NO), the data collection device 101 extracts the model of the MFP and the availability of the divisional management function of the MFP (step S123) from the registration information, and obtains, from the history storing unit 103, a required time corresponding to the same condition as this combination of the model and the availability (step S124). Here, if a plurality of values are obtained as the required times, the average of the values is to be used as the required time. If no value is obtained, a default value is to be used as the required time.

After that, the data collection device 101 checks whether any already registered start time is included in a period of the required time from the specified time (step S125). If there is not such a start time (step S126: NO), the data collection device 101 determines to register the specified time as the start time (step S130). If there is such a start time (step S126: YES), the data collecting device 101 extracts the model of the MFP and the availability of the divisional management function relating to the already registered entry (step S127), and obtains, from the history storing unit 103, a required time corresponding to the same condition as this combination of the model and the availability relating to the already registered entry (step S128).

Then, the data collection unit 101 adds the obtained required time and an interval time to the start time relating to the already registered entry, and overwrites the start time with the result of the addition as a new specified time (step S129). Here, the interval time is a time set up from considerations of connection failure that can be caused by successive calling, and the possibility that the actual required time is longer than the average required time.

The following describes an example of the above-described operations for the registration.

FIG. 4 shows an example of the registration information already registered in the database 105. In this example, five entries, namely an entry 1 to an entry 5, have been already registered.

FIG. 5 shows an example of the history of the required times stored in the history storing unit 103.

The availability of the divisional management function is not related to the periodic monitoring. Accordingly, in FIG. 5, the availability of the divisional management function as to the periodic monitoring is represented by the sign "–". This is the same in FIG. 6 and FIG. 7.

FIG. 6 shows an example of the registration information received by the data collection unit 101 as the new entries. In this example, five new entries, namely an entry 6 to an entry 10, have been received as the new entries.

<Registration of New Entry 6>

The data collection device 101 registers, in the database 105, the items included in the new entry 6, namely "telephone communication method" as the communication method, "6789-0123" as the address of the MFP at the destination, "counter information" as the type of the data, "model A" as the model of the MFP at the destination, and "not available" as the availability of the divisional management function (step S101).

Since the communication method of the entry 6 is the telephone communication method (step S102), the data collection device 101 starts the start time adjustment (step S103).

Regarding the entry 4, the data collection device 101 compares the specified time "10:00" with already registered start times (step S121). In this example, an entry 4 is already registered at the time "10:00". In other words, the specified time and the already registered time are the same (step S122: YES).

The data collection device 101 extracts "model D" as the model of the MFP at the destination, and "not available" as the availability of the divisional management function (Step S127). Then, the data collection device 101 obtains "2 minutes" as the required time corresponding to the same condition as the combination of the model and the availability (step S128). The data collection device 101 adds the required time "2 minutes" and the interval time "1 minute" to the start time "10:00" of the entry 4, and replaces the specified time with the result of the addition "10:03" (step S129).

Again, the data collection device 101 compares the new specified time "10:03" with the already registered times (step S121). In the example, there is no already registered time that is the same as the new specified time "10:03" of the new entry 6 (step S122: NO). Regarding the new entry 6, the data collection device 101 extracts "model A" as the model of the MFP at the destination, and "not available" as the availability of the divisional management function (Step S123). Then, the data collection device 101 obtains "2 minutes" as the required time corresponding to the same condition as this combination of the model and the availability (step S124). The data collection device 101 compares the time period of the required time "2 minutes" from the new specified time "10:03" with the already registered times (step S125). In the example, there is no entry between "10:03" and "10:05", which means that no registered time is included in the time period (step S126: NO). Accordingly, the data collection device 101 registers the new specified time "10:03" as the start time of the new entry 6 (step S104).

<Registration of New Entry 7>

The data collection device 101 registers, in the database 105, the items included in the new entry 7, namely "telephone communication method" as the communication method, "3456-7890" as the address of the MFP at the destination, "periodic monitoring information" as the type of the data, "model B" as the model of the MFP at the destination, and "–" as the availability of the divisional management function (step S101).

Since the communication method of the entry 7 is the telephone communication method (step S102), the data collection device 101 starts the start time adjustment (step S103).

The data collection device 101 compares the specified time "10:00" with already registered times (step S121). In this example, the entry 4 is already registered at the time "10:00". In addition, the entry 6 also is registered at the time "10:03". Accordingly, the specified time of the new entry 7 is to be replaced by a time "10:06", which is derived by adding the interval time "1 minute" to the end time of the entry 6 "10:05".

The data collection device 101 compares the new specified time "10:06" with the already registered times (step S121). In the example, there is no already registered time that is the same as the new specified time "10:06" of the new entry 7 (step S122: NO). Regarding the new entry 7, the data collection device 101 extracts "model B" as the model of the MFP at the destination, and "–" as the availability of the divisional management function (Step S123). Then, the data collection device 101 obtains "3 minutes" as the required time corresponding to the same condition as this combination of the model and the availability (step S124). The data collection device 101 compares a time period of the required time "3 minutes" from the new specified time "10:06" with the already registered times (step S125). In the example, there is no entry between "10:06" and "10:09" (step S126: NO). Accordingly, the data collection device 101 registers the new specified time "10:06" as the start time of the new entry 7 (step S104).

<Registration of New Entry 8>

The data collection device 101 registers, in the database 105, the items included in the new entry 8, namely "telephone communication method" as the communication method, "1234-2345" as the address of the MFP at the destination, "counter information" as the type of the data, "model A" as the model of the MFP at the destination, and "not available" as the availability of the divisional management function (step S101).

Since the communication method of the entry 8 is the telephone communication method (step S102), the data collection device 101 starts the start time adjustment (step S103).

Since the end time of the entry 7 is "10:09", the data collection device 101 compares a time "10:10" with already registered times (step S121). In this example, the entry 5 is already registered at the time "10:10". In other words, the specified time and the already registered time are the same (step S122: YES).

Regarding the entry 5, the data collection device 101 extracts "model A" as the model of the MFP at the destination, and "available" as the availability of the divisional management function (Step S127). Then, the data collection device 101 obtains "4 minutes" as the required time corresponding to the same condition as this combination of the model and the availability (step S128). The data collection device 101 adds the required time "4 minutes" and the interval time "1 minute" to the registered time "10:10", and replaces the specified time with the result of the addition "10:15" (step S129).

The data collection device 101 compares the new specified time "10:15" with the already registered times (step S121). In the example, there is no already registered time that is the same as the new specified time "10:15" of the new entry 8 (step S122: NO). Regarding the new entry 8, the data collection device 101 extracts "model A" as the model of the MFP at the destination, and "not available" as the availability of the divisional management function (Step S123). Then, the data collection device 101 obtains "2 minutes" as the required time corresponding to the same condition as this combination of the model and the availability (step S124). The data collection device 101 compares a time period of the required time "2 minutes" from the new specified time "10:15" with the already registered times (step S125). In the example, there is no entry between "10:15" and "10:17" (step S126: NO). Accordingly, the data collection device 101 registers the new specified time "10:15" as the start time of the new entry 8 (step S104).

<Registration of New Entry 9>

The data collection device 101 registers, in the database 105, the items included in the new entry 9, namely "telephone communication method" as the communication method, "2222-1111" as the address of the MFP at the destination, "counter information" as the type of the data, "model C" as the model of the MFP at the destination, and "not available" as the availability of the divisional management function (step S101).

Since the communication method of the entry 9 is the telephone communication method (step S102), the data collection device 101 starts the start time adjustment (step S103).

Since the end time of the entry 8 is "10:17", the data collection device 101 compares a time "10:18" with already registered times (step S121). In the example, there is no already registered time that is the same as the new specified time "10:18" of the new entry 9 (step S122: NO). Regarding the new entry 9, the data collection device 101 extracts "model C" as the model of the MFP at the destination, and "not available" as the availability of the divisional management function (Step S123). Then, the data collection device 101 obtains "3 minutes" as the required time corresponding to the same condition as this combination of the model and the availability (step S124). The data collection device 101 compares a time period of the required time "3 minutes" from the new specified time "10:18" with the already registered times (step S125). In the example, there is no entry between "10:18" and "10:21", which means that no registered time is included in the time period (step S126: NO). Accordingly, the data collection device 101 registers the new specified time "10:18" as the start time of the new entry 9 (step S104).

<Registration of New Entry 10>

The data collection device 101 registers, in the database 105, the items included in the new entry 10, namely "telephone communication method" as the communication method, "3333-4444" as the address of the MFP at the destination, "periodic monitoring information" as the type of the data, "model D" as the model of the MFP at the destination, and "–" as the availability of the divisional management function (step S101).

Since the communication method of the entry 10 is the telephone communication method (step S102), the data collection device 101 starts the start time adjustment (step S103).

Since the end time of the entry 9 is "10:21", the data collection device 101 compares a time "10:22" with already registered times (step S121). In the example, there is no already registered time that is the same as the new specified time "10:22" of the new entry 10 (step S122: NO). Regarding the new entry 10, the data collection device 101 extracts "model D" as the model of the MFP at the destination, and "–" as the availability of the divisional management function (Step S123). Then, the data collection device 101 obtains "5 minutes" as the required time corresponding to the same condition as this combination of the model and the availability (step S124). The data collection device 101 compares a time period of the required time "5 minutes" from the new specified time "10:22" with the already registered times (step S125). In the example, there is no entry between "10:22" and "10:27" (step S126: NO). Accordingly, the data collection device 101 registers the new specified time "10:22" as the start time of the new entry 10 (step S104).

FIG. 7 shows the result that the new entries 6 to 10 are registered in the database 105.

As described above, with the data collection device according to the first embodiment, new entries are prevented from being registered at times that have been already registered. As a result, the delay in the start time can be prevented. Usually, with reference to the list of the start times, the administrator understands that the data collection is performed right at the start time. Therefore, the present invention realizes the data collection performed punctually according to the schedule as the administrator understands. This makes it easy to manage the time periods in which the data collection is performed. For instance, the administrator can sufficiently recognize the busy time of the communication, and therefore it becomes easy to add new communication processes and distribute the communication processes.

Furthermore, it becomes possible to register new entries at once, which reduces the workload of the administrator.

The Second Embodiment

The second embodiment is the same as the first embodiment except for the start time adjustment. Only the start time adjustment according to the second embodiment is described next.

Figure 8:
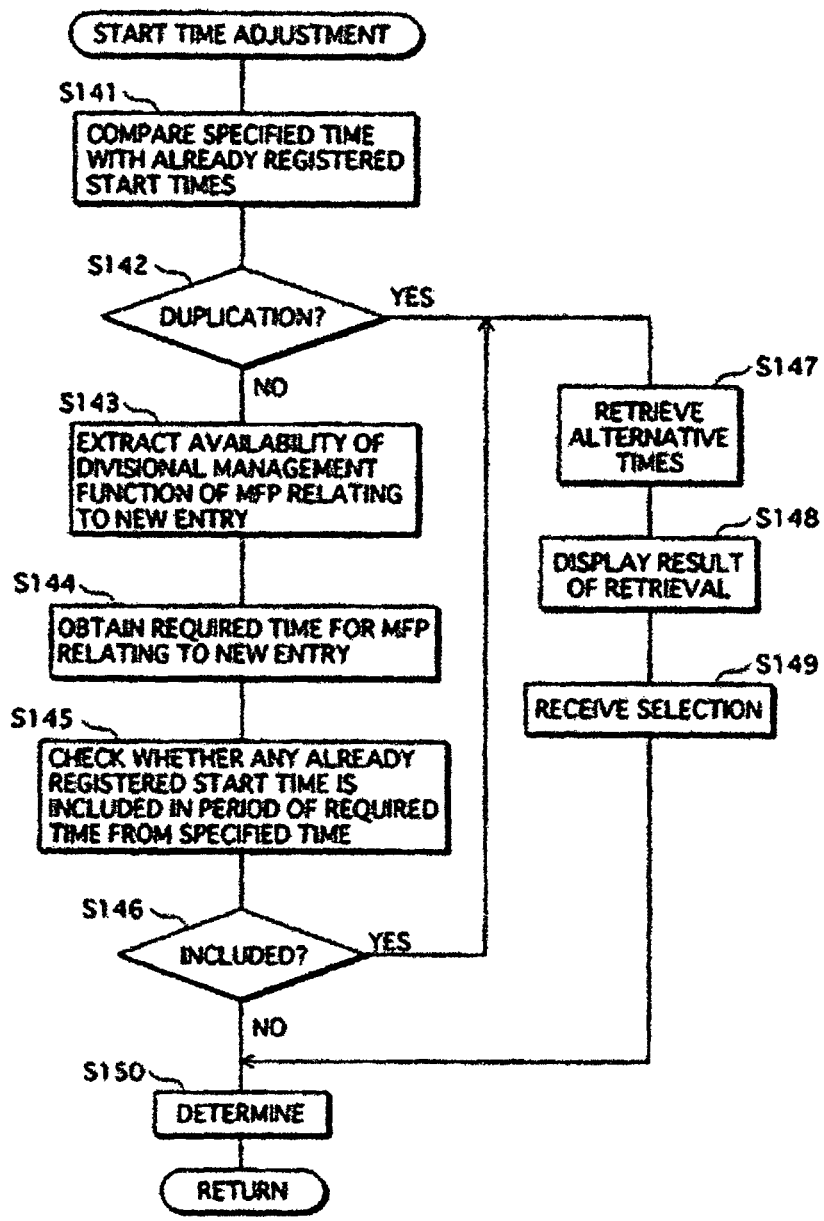
FIG. 8 is a flowchart showing details of start time adjustment according to the second embodiment.

FIG. 8 shows the details of the start time adjustment according to the second embodiment.

The data collection device 101 compares the received specified time with the already registered times (step S141).

If the received specified time is not the same as any of the already registered start times (step S142: NO), the data collection device 101 extracts the model of the MFP and the availability of the divisional management function in the MFP (step S143), and obtains the required time corresponding to the same condition as the combination of the model and the availability (step S144). After that, the data collection device 101 compares a time period of the required time from the specified time with the already registered times (step S145). If no already registered time is included in the time period (step S146: NO), the data collection device 101 determines to register the specified time as the start time (step S150). Meanwhile, if an already registered time is included in the time period (step S146: YES), the data collection device 101 retrieves alternative times that are different from the specified time and not included in the time period (step S147). For instance, to register the new entry 6 shown in FIG. 6, the data collection device 101 retrieves alternative times such as "9:51", "9:52", "9:53", and "10:03", using the required time (2 minutes) of the new entry. It is easy to realize the search for the alternative times if the data collection device 101 manages one-bit information which indicates, for each time, whether the time has been already registered.

The data collection device displays the result of the retrieval (step S148), and receives a selection by the administrator (step S149).

This makes it possible to register an alternative time based on the intention of the administrator. Accordingly, the data collection device 101 can avoid that an unexpected alternative time is registered regardless of the intention of the user.

The Third Embodiment

<Structure>

Figure 9:
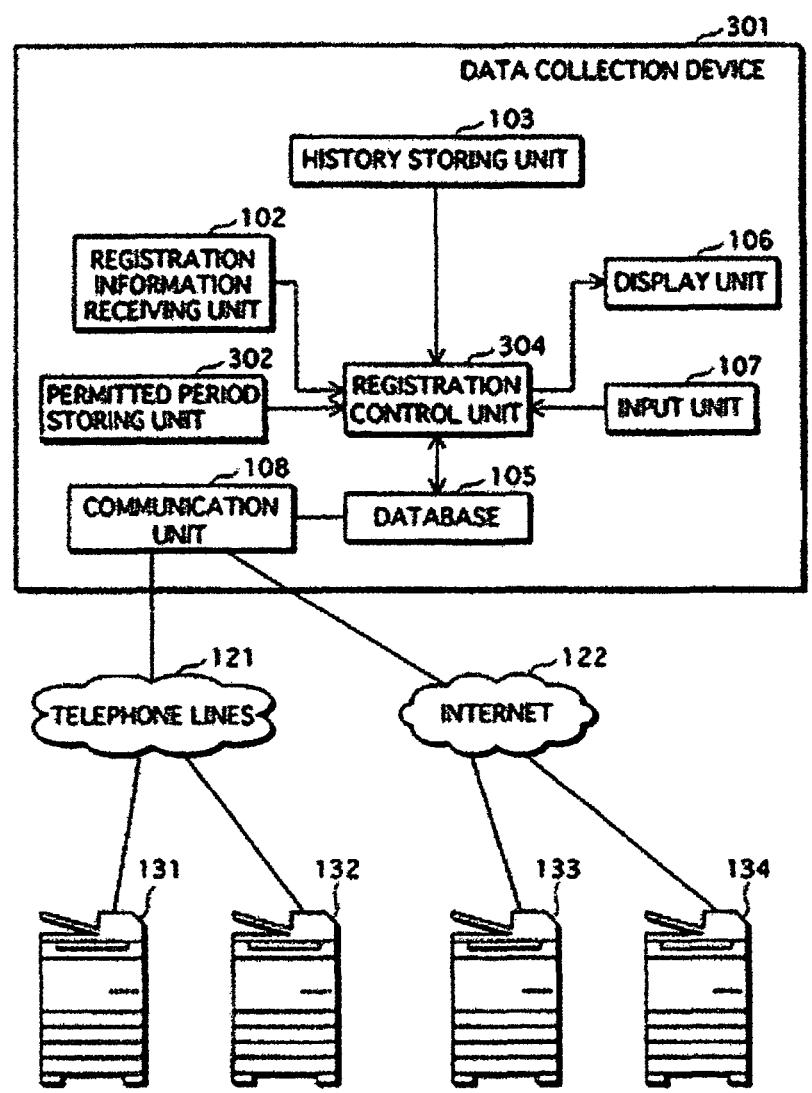
FIG. 9 is a functional block diagram showing the structure of a data collection device according to the third embodiment.

FIG. 9 is a functional block diagram showing the structure of a data collection device according to the third embodiment.

A data collection device 301 includes a registration information receiving unit 102, a history storing unit 103, a registration control unit 304, a database 105, a display unit 106, an input unit 107, a communication unit 108, and a permitted period storing unit 302.

The data collection device 301 according to the third embodiment is the same as the data collection device 101 of the first embodiment except for the permitted period storing unit 302 and the registration control unit 304. Only the permitted period storing unit 302 and the registration control unit 304 are described next.

The permitted period storing unit 302 stores permitted periods in which the new entries may be registered. The registration control unit 304 registers each new entry within a corresponding one of the permitted periods.

For instance, in the case of charging a customer based on usage of the MFP, if the data collection is performed on a day other than the day specified by the customer, it might affect the accounting operation. If this is the case, "the day including the specified period" is to be stored as the permitted period. Accordingly, the data collection device can avoid that the start time of a new entry is registered on a day other than the specified day.

<Operation>

FIG. 10 is a flowchart showing operations performed by the data collection device 301 according to the third embodiment for registering a new entry.

Firstly, the data collection device 301 registers the items of data included in the received registration information except for the specified time (step S301)

Next, the data collection device 301 extracts the item of the communication method used for the data collection. If the communication method is the telephone communication method, a new specified time, which has been adjusted through a start time adjustment (step S303) and is within the permitted period (step S304), is to be registered as the start time. If the communication method is the E-mail method, the specified time is to be registered as the start time without change (step S305). Then, the data collection device 301 displays the result of the registration (step S306). Meanwhile, if the new specified time, having been adjusted through the start time adjustment (step S303), is not within the permitted period, the time is not to be registered as the start time, and the data collection device 301 displays a note to inform the administrator accordingly (step S308).

The repeats the above-described operations until there is no new entry to be registered (step S307). Note that the start time adjustment is the same as that of the first embodiment.

In this way, the permitted period is predetermined by the administrator, and therefore the data collection device 301 can avoid that an unexpected alternative time is registered regardless of the intention of the user.

The data collection device according to the present invention is described above based on the embodiments. However, the present invention is not limited to the embodiments. The following are examples of possible modifications.

(1) In the embodiments, the telephone communication method and the E-mail method are described as examples of the communication method. However, the present invention is applicable even if other methods are used. For instance, a HTTP method using HTTP (Hyper Text Transfer Protocol) is available. If this is the case, it is possible not to permit duplicative registration to avoid deterioration of the access performance. Alternatively, the duplicative registration may be permitted as long as the number of the duplication is not more than a predetermined limit. The limit may be changed appropriately in consideration of the access performance.

(2) In the embodiments, the combination of the model of the MFP and the availability of the divisional management function is used for specifying the required time. However, only the model of the MFP, or only the availability of the divisional management function may be used for specifying the required time.

(3) In the embodiments, the required time is managed based on the availability of the divisional management function. However, it may be more strictly managed for each division. Also, if the MFP is designed to manage the usage for each person, not for each division, the required time may be managed for each person accordingly.

(4) In the start time adjustment of the first embodiment, the search of the alternative time is started from the specified time as a start point, and proceeds so that later times are included in the scope of the search. Then, the time that is found first is retrieved and registered as the alternative time. However, the search of the alternative time may proceed so that earlier times than the specified time are included in the scope of the search.

(5) For the search for the alternative time performed in the start time adjustment, a means for receiving conditions of the start time desired by the user may be provided. If this is the case, a list of the alternative times that match the conditions may be displayed so that the administrator can select. Furthermore, in the case that there is no alternative time that matches the conditions, a note may be displayed to inform the administrator accordingly and encourage the administrator to input new conditions.

(6) In the embodiments, the counter information and the periodically monitoring information is collected from each MFP. However, other information maybe collected.

(7) In the embodiments, the upper limit of the duplication for the E-mail method is an infinite value. However, a finite value may be set as the upper limit.

(8) In the embodiments, since the upper limit of the duplication for the E-mail method is an infinite value, it is unnecessary to manage the duplication of the data collection based on the time periods. Therefore, the data collection device omits storing the required times, which realizes an efficient use of the memory resources. However, the present invention is not limited to this. The start times and the required times may be managed even if the E-mail method is used.

(9) In the embodiments, the start time of the data collection is registered in the database 105, and the time period in which the data collection is to be performed is derived from the start time and the required time according to need. Accordingly, the time period can be registered substantially, and the efficient use of the memory resources is realized at the same time. However, the present invention is not limited to this. The start time and the end time may be registered for each data collection.

(10) In the embodiments, the time period in which the data collection is to be performed is derived from the start time and the required time. However, the present invention is not limited this. The time period may be derived from the end time and the required time.

(11) In the embodiments, the devices are mainly described. However, the present invention may be a method or a program. Also, combinations among the embodiments are also available.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data collection device that performs procedures for collecting data from a plurality of terminal devices, the data collection device comprising:
    a processor;
    a database in which start times of the procedures for collecting data from the plurality of terminal devices have been previously registered;
    a receiving unit controlled by the processor to receive a communication from each of the plurality of terminal devices to collect the data from the terminal devices and to receive from the terminal devices a start time that is to be newly registered in the database for a new one of the procedures, the communication from each of the plurality of terminal devices being one of a first communication method that allows a received start time that is to be newly registered in the database to be the same as a previously registered start time, and a second method that does not allow a received start time that is to be newly registered in the database to be the same as a previously registered start time;
    a communication method determining unit that determines whether the communication received from one of the plurality of terminal devices is the first communication method or the second communication method; and
    a registration control unit controlled by the processor, when it is determined that the received start time is the same as any of the previously registered start times and that the received communication that collects the data is the second communication method, to search and retrieve a different start time that is different from any of the previously registered start times, instead of registering the received start time;
    the registration control unit further controlled by the processor to register the received start time when it is determined that the communication that collects the data is the first communication method that allows the received start time to be the same as a previously registered start time.

2. The data collection device of claim 1, further comprising:
    a storing unit controlled by the processor to store a required time for completing each set of the procedures, wherein
    the registration control unit searches and retrieves, when a first time period overlaps any of second time periods, a time at a beginning of a third time period, instead of registering the received start time, even if the received start time is different from any of the previously registered start times, the first time period being a period of the required time from the received start time, each second time period being a period of the required time from each previously registered start time, and the third time period not overlapping any of the second time periods.

3. The data collection device of claim 2, wherein
    the registration control unit further registers the retrieved time in the database in association with the new one of the procedures.

4. The data collection device of claim 3, wherein
    when the first time period is different from any of the second time periods, the registration control unit further registers the received start time in the database in association with the new one of the procedures.

5. The data collection device of claim 4, wherein
    the registration control unit includes:
    a judging subunit to judge whether the first time period overlaps any of the second time periods; and
    a registering subunit, if the judging subunit judges in the negative, to register a time at a beginning of the first time period in association with the new set of the procedures, and, when the judging subunit judges in the affirmative, to replace the first time period with a time period that is shifted a predetermined time from the second time period.

6. The data collection device of claim 4, wherein
    the registration control unit includes:
    a presenting subunit, when the first time period overlaps any of the second time periods, to present a list of one or more time periods each of which does not overlap any of the second time periods; and
    a registering subunit to register a time at a beginning of a time period that is selected from the list by a user in association with the new one of the procedures.

7. The data collection device of claim 4, further comprising:
    a storing unit to store a permitted period within which the start time of the new one of the procedures is permitted to be registered, wherein
    the registration control unit registers the time at the beginning of the third time period only if the third time period is within the permitted period.

8. The data collection device of claim 2, wherein
    the required time is a time that was required to complete the same procedures as each set of the procedures in the past, and has been previously stored in the storing unit in association with a model of a terminal device relating to each of the procedures, the receiving unit further receives a model of a terminal device relating to the new one of the procedures, and the registration control unit uses the required time that corresponds to the received model.

9. The data collection device of claim 2, wherein the data represents usage of each terminal device per user, the required time is a time that was required to complete each set of the procedures in the past, and has been previously stored in the storing unit in association with a combination of a model of a terminal device relating to each of the procedures and a number of users of the terminal device, the receiving unit further receives a model of a terminal device relating to the new one of the procedures and a number of users of the terminal device, and the registration control unit uses the required time that corresponds to the received combination of the model of the terminal device relating to the new one of the procedures and the number of the users of the terminal device.

10. The data collection device of claim 1, wherein the procedures are performed utilizing the first method, the first method having a limit to a maximum number of duplicative registrations in the database, and the registration control unit registers, if a number of registrations in the database is less than the maximum number, the received start time in the database in association with the new one of the procedures, even if the received start time is the same as any of the previously registered start times.

11. A non-transitory computer readable storage medium comprising a program, which when executed causes a computer to collect data from a plurality of terminal devices to perform:

receiving a communication from each of the plurality of terminal devices to collect the data from the terminal devices and receive from the terminal devices a start time that is to be newly registered in a database for executing a new procedure, the communication from each of the plurality of terminal devices being one of a first communication method that allows a received start time that is to be newly registered in the database to be the same as a previously registered start time, and a second method that does not allow a received start time that is to be newly registered in the database to be the same as a previously registered start time;

determining whether the communication received from one of the plurality of terminal devices is the first communication method or the second communication method; and searching and retrieving, when it is determined that the received start time is the same as any previously registered start time in the database and that the received communication is the second communication method, a different start time that is different from any of the previously registered start times in association with the new procedure, instead of registering the received start time;

registering the received start time when it is determined that the communication is the first communication method that allows the received start time to be the same as a previously registered start time.

12. The non-transitory computer readable storage medium of claim 11, wherein the registration control step searches and retrieves, if a first time period overlaps any of second time periods, a time at a beginning of a third time period, instead of registering the received start time, even if the received start time is different from any of the previously registered start times, the first time period being a period of the required time from the received start time, each second time period being a period of the required time from each previously registered start time, and the third time period not overlapping any of the second time periods.

13. A data collection method for performing procedures for collecting data from a plurality of terminal devices, the data collection method comprising:

receiving a communication from each of the plurality of terminal devices to collect the data from the terminal devices and receive from the terminal devices a start time that is to be newly registered in a database for executing a new procedure, the communication from each of the plurality of terminal devices being one of a first communication method that allows a received start time that is to be newly registered in the database to be the same as a previously registered start time, and a second method that does not allow a received start time that is to be newly registered in the database to be the same as a previously registered start time;

determining whether the communication received from one of the plurality of terminal devices is the first communication method or the second communication method; and searching and retrieving, when it is determined that the received start time is the same as any previously registered start time in the database and that the received communication is the second communication method, a different start time that is different from any of the previously registered start times in association with the new procedure, instead of registering the received start time;

registering the received start time when it is determined that the communication is the first communication method that allows the received start time to be the same as a previously registered start time.

14. The data collection method of claim 13, wherein the registration control step searches and retrieves, if a first time period overlaps any of second time periods, a time at a beginning of a third time period, instead of registering the received start time, even if the received start time is different from any of the previously registered start times, the first time period being a period of the required time from the received start time, each second time period being a period of the required time from each previously registered start time, and the third time period not overlapping any of the second time periods.

15. The data collection device of claim 1, wherein the first method is an E-mail method or a Hyper Text Transfer Protocol (HTTP) method.

16. The non-transitory computer readable storage medium of claim 11, wherein the first method is an E-mail method or a Hyper Text Transfer Protocol (HTTP) method.

17. The data collection method claim 13, wherein the first method is an E-mail method or a Hyper Text Transfer Protocol (HTTP) method.

18. The data collection device of claim 1, wherein the second method is a telephone method.

19. The non-transitory computer readable storage medium of claim 11, wherein the second method is a telephone method.

20. The data collection method claim 13, wherein the second method is a telephone method.

21. The data collection device of claim 1, wherein the data collected from the plurality of terminal devices are counter information that indicate the number of prints that a terminal device has been printed out or are periodic monitoring information for each terminal device.

22. The data collection device of claim 1, wherein the terminal devices are a multi functional peripherals.

23. The non-transitory computer readable storage medium of claim 11, wherein the data collected from the plurality of terminal devices are counter information that indicate the number of prints that a terminal device has been printed out or are periodic monitoring information for each terminal device.

24. The non-transitory computer readable storage medium of claim 11, wherein the terminal devices are a multi functional peripherals.

25. The data collection method claim 13, wherein the data collected from the plurality of terminal devices are counter information that indicate the number of prints that a terminal device has been printed out or are periodic monitoring information for each terminal device.

26. The data collection method claim 13, wherein the terminal devices are a multi functional peripherals.

* * * * *